(12) United States Patent
Chung et al.

(10) Patent No.: US 7,839,922 B2
(45) Date of Patent: Nov. 23, 2010

(54) DECISION FEEDBACK EQUALIZER CIRCUIT

(75) Inventors: David Kyong-Sik Chung, Irvine, CA (US); Afshin Momtaz, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1401 days.

(21) Appl. No.: 10/847,829

(22) Filed: May 18, 2004

(65) Prior Publication Data

US 2005/0271136 A1 Dec. 8, 2005

(51) Int. Cl.
*H03H 7/30* (2006.01)

(52) U.S. Cl. .................. 375/233; 375/232; 375/229

(58) Field of Classification Search .......... 375/233, 375/229, 232
See application file for complete search history.

(56) References Cited

U.S. PATENT DOCUMENTS

| | | | |
|---|---|---|---|
| 5,280,346 A * | 1/1994 | Ross | 348/602 |
| 5,694,063 A * | 12/1997 | Burlison et al. | 327/50 |
| 6,320,422 B1 * | 11/2001 | Koh | 326/115 |
| 6,556,637 B1 * | 4/2003 | Moriuchi | 375/350 |
| 6,697,423 B1 * | 2/2004 | Jin et al. | 375/233 |
| 6,904,089 B1 * | 6/2005 | Sueyoshi et al. | 375/240 |
| 6,931,088 B1 * | 8/2005 | Tomita | 375/376 |
| 7,030,657 B2 * | 4/2006 | Stojanovic et al. | 326/87 |
| 7,130,366 B2 * | 10/2006 | Phanse et al. | 375/350 |
| 7,158,566 B2 * | 1/2007 | Dowling | 375/229 |
| 7,233,164 B2 * | 6/2007 | Stojanovic et al. | 326/22 |
| 7,254,173 B1 * | 8/2007 | Fu et al. | 375/233 |
| 7,496,161 B2 * | 2/2009 | Chou et al. | 375/344 |
| 2002/0027953 A1 * | 3/2002 | Hwang et al. | 375/232 |
| 2004/0136731 A1 * | 7/2004 | Wang et al. | 398/208 |
| 2004/0258145 A1 * | 12/2004 | Popescu et al. | 375/232 |
| 2005/0053125 A1 * | 3/2005 | Balamurugan et al. | 375/232 |
| 2005/0286644 A1 * | 12/2005 | Jaussi et al. | 375/257 |

* cited by examiner

*Primary Examiner*—Shuwang Liu
*Assistant Examiner*—Kenneth Lam

(57) ABSTRACT

An equalization circuit adjusts (e.g., equalizes) an input signal according to the value of one or more adjustment signals (e.g., equalization coefficients) without a multiplication operation. For example, the circuit may add or subtract a value of a coefficient signal to the amplitude of an input signal. Here, whether the coefficient is added or subtracted may depend on the sign of a control signal.

21 Claims, 8 Drawing Sheets

US 7,839,922 B2

DECISION FEEDBACK EQUALIZER CIRCUIT

TECHNICAL FIELD

This application relates to signal processing and, more specifically, to a decision feedback equalizer circuit that equalizes a signal without the use of multipliers.

BACKGROUND

Electronic devices are made up of a variety of logic components including, for example, buffers, flip-flops, adders and multipliers. These components have a variety of characteristics including size, speed of operation and power consumption. In general, a designer will select components for a given application based on the requirements of that application. For example, a designer may need to use certain high speed components in a high speed application even though these components have other characteristics (e.g., high power consumption) that are undesirable.

In many applications, it is desirable to reduce the size of the electronic devices used in the applications. For example, smaller electronic devices tend to be more convenient to use. Accordingly, one trend in component design is to reduce the size of the individual components that make up the electronic devices.

Reductions in the size of components may be particularly advantageous in electronic devices used in high speed applications. In high speed applications relatively fast signals are routed between components. In general, however, these signals will tend to degrade as the distance the signal travels increases. Since smaller components may provide for smaller distances between components, devices with smaller components may have better signal quality compared to other devices.

In many applications, it is desirable to reduce the power consumption of a given electronic device. A reduction in power consumption may have many beneficial effects. For example, smaller power supplies may be used with devices that consume less power. This may result in a reduction in the size of the entire electronic system. In portable electronic devices, reduced power consumption may result in longer battery life. Moreover, reduced power consumption tends to reduce the heat generated by the electronic device. It is desirable to reduce the heat generated in an electronic device because heat tends to adversely affect the operation of electronic devices. Accordingly, one trend in component design is to reduce the power consumption of the individual components that make up a given electronic device.

In view of the above, a need exists for improved components such as those used in electronic devices, particularly in high speed applications such as communications receivers.

SUMMARY

The invention relates to a simplified decision feedback equalizer circuit. For convenience, an embodiment of an apparatus constructed or a method practiced according to the invention will be referred to herein simply as an "embodiment."

In some embodiments, the equalizer circuit equalizes a signal by adding one or more equalization signals (e.g., equalization coefficients) to an input signal in a communications receiver. In certain cases, an input signal may be equalized without a multiplication operation as is common in conventional equalization circuits. As an example, a decision feedback equalizer may incorporate a multiplexer circuit in the feedback path instead one or more multipliers.

A conventional one tap feedback equalizer 100 is depicted in FIG. 1. A summer 104 combines incoming data 102 with a feedback signal 118. A slicer 108 converts the output 106 of the summer (soft decision) to a binary signal. A retimer 110 (e.g., a flip flop) recovers the data from the binary signal in response to a recovered clock signal. A multiplier 114 in the feedback path multiplies the recovered data 112 by an equalization coefficient g1 116 (typically a negative number) to generate a scaled feedback signal 118 that is then combined with incoming data 102 as discussed above. The decision feedback equalizer therefore serves to subtract a previous symbol (n−1) from a current symbol (n) to reduce or eliminate channel induced distortion such as inter-symbol interference.

In high speed applications such as 10 Gigabit ("Gbit") receivers, the use of a multiplier in the feedback path may present several challenges. For example, the multiplier may consume a relatively large amount of power and space on the integrated circuit die and introduce significant delay in the signal path.

Delay in the signal path may be particularly important in applications where a decision feedback equalizer is designed to share the retimer with a clock and data recovery ("CDR") circuit as described in U.S. patent application Ser. No. 10/823,252, filed Apr. 10, 2004. A conventional equalizer may tolerate a delay of up to one data bit period (minus the setup time of a latch or flip-flop) in the feedback path. In contrast, for a decision feedback equalizer that shares the feedback flip-flop with a clock and data recovery ("CDR") circuit, the feedback delay path should be as close to one half of one data bit period as possible. At high speed (e.g., 10 Gbits per second) operation, signal delay through various components in the feedback path such a flip-flop, a summer and a slicer may approach or exceed one half of one data bit period. Consequently, the introduction of another significant delay component such as a multiplier may make it even more difficult to meet the timing requirement for the clock and data recovery circuit.

Because the retimer is configured to output a binary signal (e.g., +1 or −1) as discussed above, the output of the feedback multiplier 114 would be, for example, +g1 or −g1, respectively. Thus, the operation of multiplying the retimer output signal with the coefficient signal and then adding the result to the input signal may be replaced with an operation that adds the input signal to the desired feedback signals as provided by a multiplexer that outputs either +g1 or −g1. Here, the multiplexer may be controlled by a control signal such as the output of the retimer.

Hence, the feedback multiplier 114 may be replaced with a multiplexer circuit. The multiplexer circuit selects, for example, either +g1 or −g1 to be added to the input signal. Here, the coefficient g1 may be added or subtracted to the input signal according to the sign of a control signal such as the output of the retimer.

A more effective decision feedback equalizer may be provided through the use of the above techniques. For example, a multiplexer is typically smaller and consumes less power than a multiplier. In addition, a multiplexer may present less parasitic load to a driving circuit and introduce less delay in the signal path. As a result, the simplified decision feedback equalizer may be better suited for high speed applications than conventional decision feedback equalizers.

In some embodiments, an integrated summer/multiplexer circuit is implemented using a current mode circuit that adds two or more signal together by adding currents associated with those signals. For example, in a differential summer circuit a first differential signal may drive the inputs of a first differential transistor pair. The differential transistor pair generates a differential output current signal in accordance with the first differential signal. Each of these output current signals flow through respective load resistors to generate a differential output signal at the output nodes of the differential transistor pair.

In some embodiments, to add a second signal to the first differential signal a switch is coupled to the output nodes of the first differential transistor pair to combine a second current signal with the differential output current signal.

In some embodiments, depending on the value of a control signal the switch either "adds" or "subtracts" the first signal to the second signal by summing the second current signal to one of the differential output current signals.

In some embodiments a programmable current source provides the second current signal. For example, a digital to analog converter ("DAC") may be used to provide incremental values of constant current according to the programmed value of a digital control signal. That is, when the value of the control signal for the DAC is changed, the current output by the switch changes accordingly.

In some embodiments the switch consists of a second differential transistor pair. In this case, the control signal is a differential signal that drives the inputs of the second differential transistor pair. When a relatively large control signal is used to switch the second differential transistor pair, then virtually the entire second current signal will be available to sum at the output nodes of the first differential transistor pair. Thus, in these embodiments, the second current signal is provided by the tail current of the second differential transistor pair.

In some embodiments, the current mode summer circuit is used to equalize an input signal. For example, as discussed above an equalization coefficient may be added to the input signal in a communications receiver when the retimer is configured to output binary data.

In this case, the switch (e.g., second differential transistor pair) selectively couples a differential current signal with the differential output current signal. Here, the differential current signal is proportional to an equalization coefficient. For example, the coefficient value may be used to control the programmable current source. In this way, a current proportional to the value of the coefficient may be used to "add" or "subtract" the equalization coefficient to/from the input signal.

Again, the switch (e.g., second differential transistor pair) may be directly controlled by the output of the retimer. Depending on the output of the retimer (e.g., +1 or −1) the switch adds the second current signal to one of the two differential output current signals. As a result, the equalization signal is either "added to" or "subtracted from" the input signal according to the sign of retimer output.

BRIEF DESCRIPTION OF THE DRAWINGS

These and other features, aspects and advantages of the present invention will be more fully understood when considered with respect to the following detailed description, appended claims and accompanying drawings, wherein:

Figure 1:
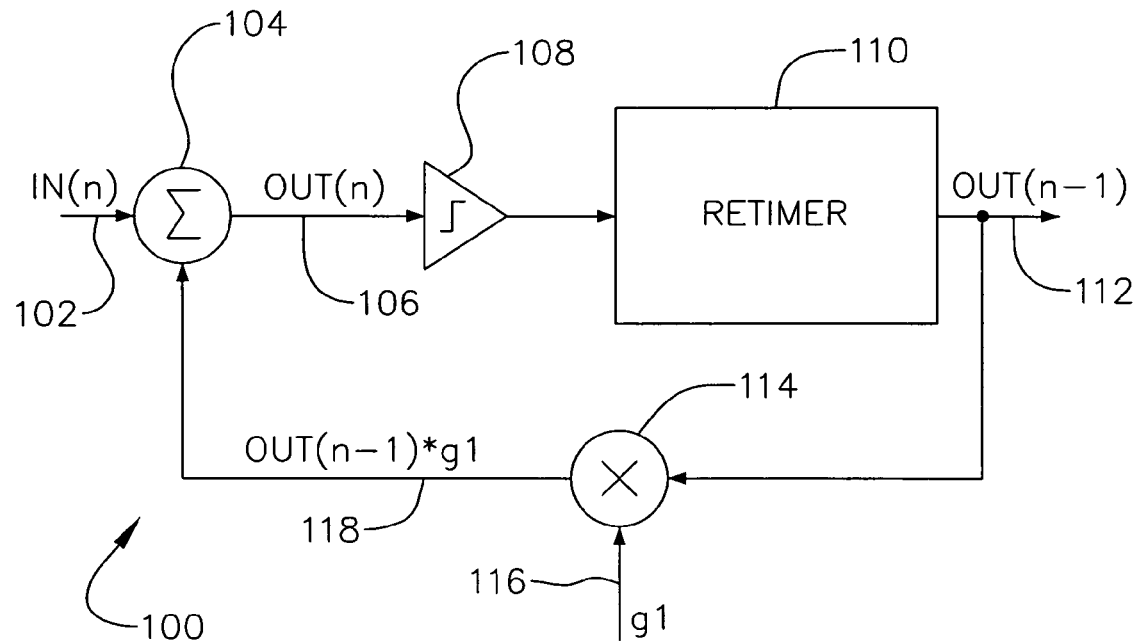
FIG. 1 is a simplified block diagram of one embodiment of a one tap decision feedback equalizer.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

A typical decision feedback equalizer ("DFE") includes a summer (summation of input and feedback signals) and controlled equalization (multiplier cells such as Gilbert cells typically are used to apply the desired amount of equalization). Equalization may be performed in two steps. The first step involves multiplying a feedback signal with the desired amount of equalization. The second step involves summing the result of the multiplication with the incoming signal. This behavior may be expressed as an equation:

$$\text{out}(n)=\text{in}(n)-\{\text{out}(n-1)*g1\} \qquad \text{EQUATION 1}$$

where g1 is the desired amount of equalization.

The parameter out(n−1) represents a decision made at time "n−1" and, in some applications, will have a value of either +1 or −1. In this case, Equation 1 may be simplified to:

$$\text{out}(n)=\text{in}(n)+/-g1 \qquad \text{EQUATION 2}$$

Figure 2:
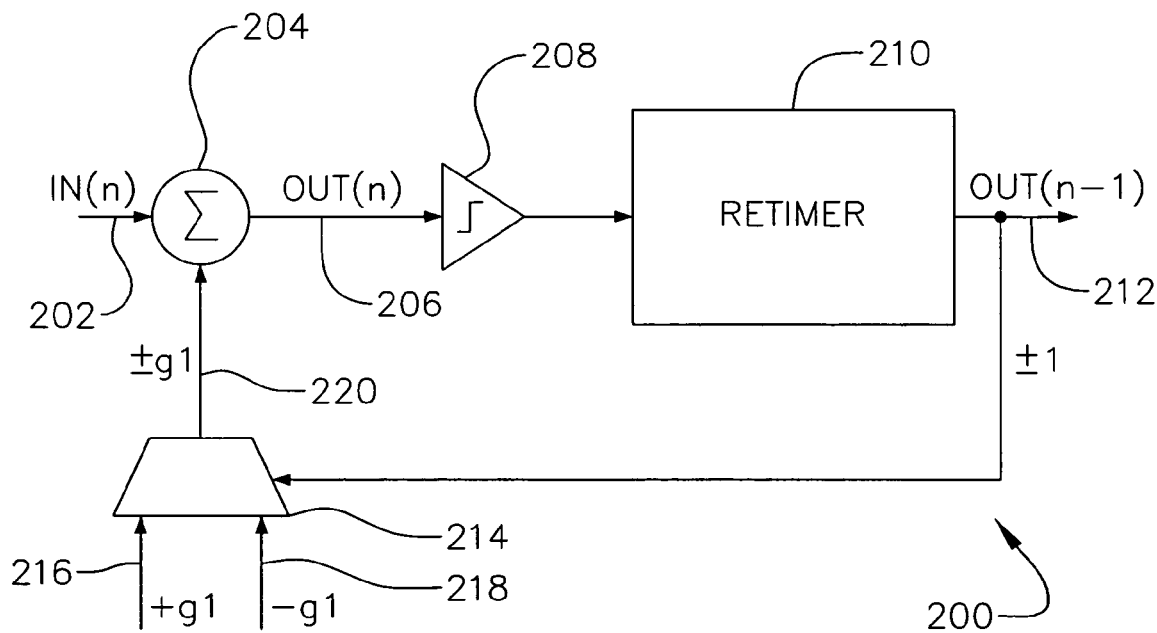
FIG. 2 is a simplified block diagram of one embodiment of a one tap decision feedback equalizer constructed in accordance with the invention.

From the above it may be observed that the decision feedback equalizer may be implemented without a multiplier. FIG. 2 is a simplified block diagram of one embodiment of a decision feedback equalizer constructed in accordance with the invention. The operation of multiplying the retimer output signal with the coefficient signal as depicted in FIG. 1 is replaced in FIG. 2 with an operation that adds either +g1 or −g1 to the input signal 202 according to the value of the retimer output signal 212. As illustrated in FIG. 2, this may be accomplished by using a multiplexer (or switch) 214 to select either +g1 216 or −g1 218 as the feedback signal 220 provided to the summer 204.

In operation, the selected polarity of g1 depends on the polarity of the control signal for the multiplexer 214, in this case the polarity of the output signal 212 from the retimer 210. The relationship between the polarity of g1 (e.g., +g1 or −g1) and the polarity of the output signal 212 may be configured according to the needs of the particular application. For example, g1 may be defined as −g1 so that it is always subtracted from the input signal (assuming the other signals are defined as positive signals).

Figure 3:
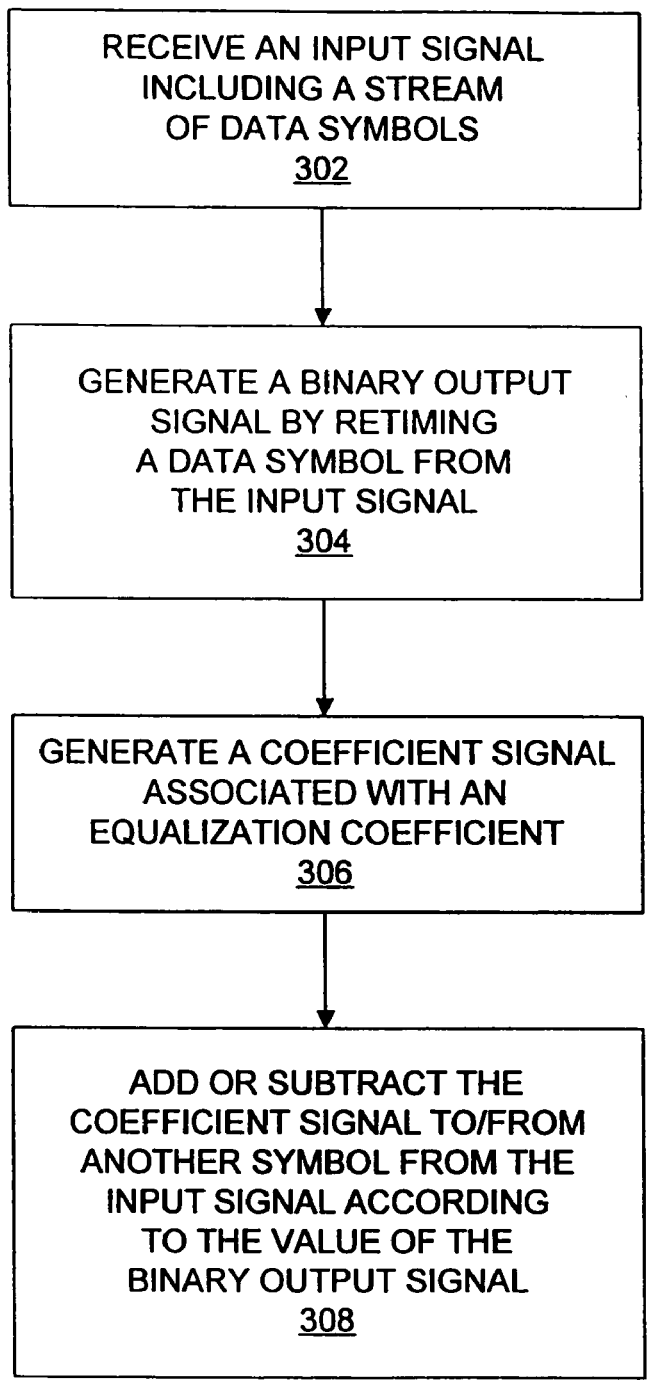
FIG. 3 is a flow chart of one embodiment of equalization operations that may be performed in accordance with the invention.

FIG. 3 describes one embodiment of operations that may be performed to equalize an input signal using an addition operation in the feedback path rather than a multiplication operation. As represented by block 302, the decision feedback equalizer receives an input signal that includes a stream of data symbols. As discussed above, the temporal relationship between these symbols may be represented by "n," "n−1," etc. That is, symbol n−1 immediately precedes symbol n in the symbol stream.

After the slicer 208 converts the output of the summer 204 to a binary signal, the retimer 210 uses a recovered clock (provided by a clock and data recovery circuit, "CDR") to sample the signal at the unit time interval of incoming data. Frequency & phase of this clock is optimally placed by the clock and data recovery circuit. The output of the retimer is a binary signal (block 304).

To provide equalization, the binary signal (e.g., a symbol at time n−1) is fed back to be combined with the next symbol (e.g., a symbol at time n) to reduce the effect of the symbol n−1 on the symbol n. Conventionally, the magnitude of the signal fed back to the input is scaled by an equalization coefficient. Accordingly, as represented by block 306, the decision feedback equalizer generates a coefficient signal that corresponds to the value of the equalization coefficient.

Next, as represented by block 308, the coefficient signal is either added to or subtracted from the input signal depending on the value of the binary symbol. For example, when the binary signal has a value of +1 the coefficient signal may be added to the input signal. Conversely, when the binary signal has a value of −1 the coefficient signal may be subtracted from the input signal.

Figure 4:
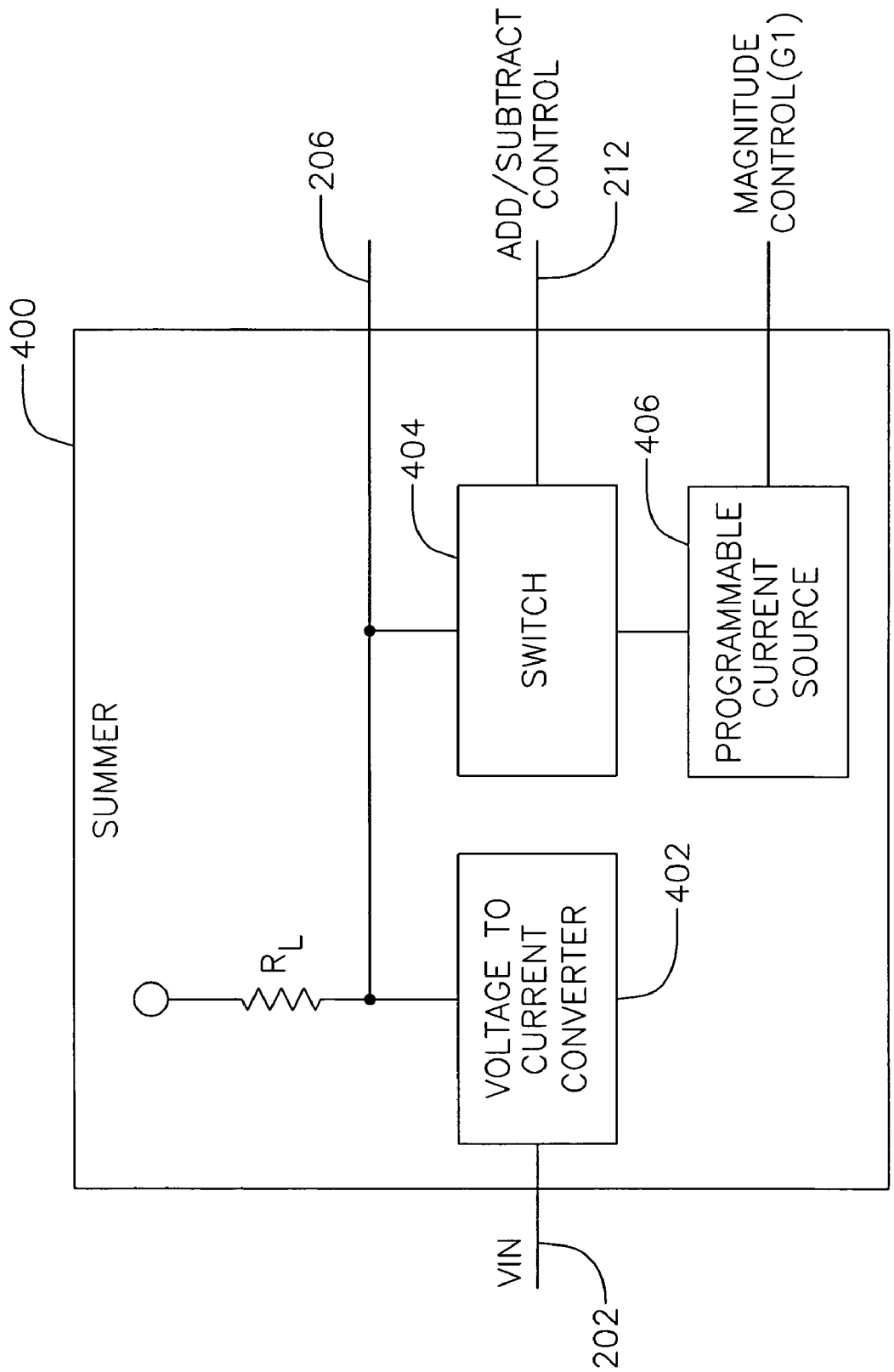
FIG. 4 is a simplified block diagram of one embodiment of a current mode summer constructed in accordance with the invention.
Figure 5:
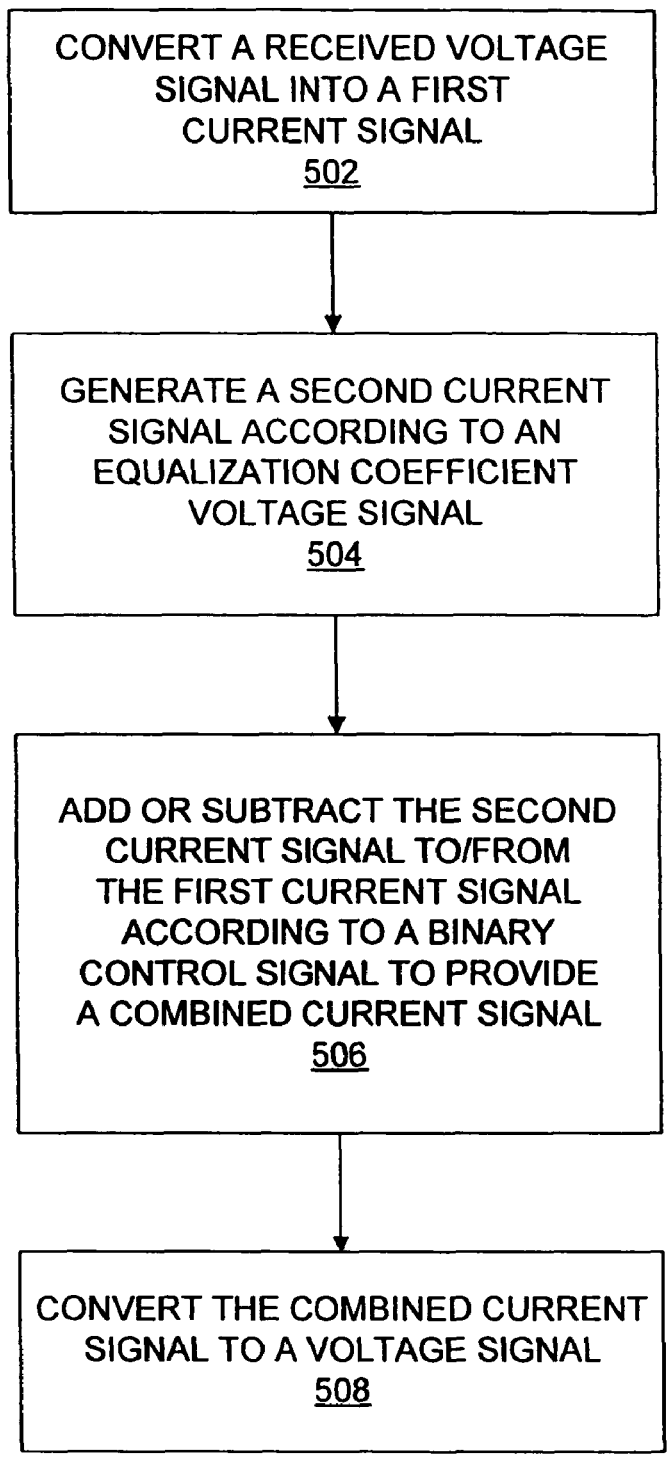
FIG. 5 is a flow chart of one embodiment of equalization operations that may be performed by a current mode summer in accordance with the invention.

Referring now to FIGS. 4 and 5, in some embodiments the addition of signals such as the input signal and the coefficient signal may be accomplished using a current mode summer. FIG. 4 depicts one embodiment of a current mode summer circuit 400 where a form of multiplexer as discussed above is merged into the summer. FIG. 5 illustrates one embodiment of current mode summer operations.

The circuit 400 in FIG. 4 combines an input signal $V_{IN}$ (e.g., signal 202 in FIG. 2) with a signal associated with a magnitude control signal. As represented by block 502 in FIG. 5, the voltage to current converter 402 in FIG. 4 converts the input signal VIN to a corresponding current signal. The current signal (hereafter "the first current signal") output by the voltage to current converter 402 flows through a resistor $R_L$ to provide a summed output signal (e.g., signal 206 in FIG. 2).

As represented by block 504, a programmable current source 406 sources or sinks a second current signal. Here, the magnitude control signal controls the magnitude of the second current signal. The magnitude control signal, in turn, corresponds to an equalization coefficient (e.g., g1). Accordingly, the magnitude of the second current signal corresponds to the magnitude of the equalization coefficient.

As represented by block 506, a switch 404 either adds or subtracts the second current to/from the first current signal. Here, an add/subtract control signal (e.g., the signal 212 generated by the retimer 210 in FIG. 2) controls whether the switch adds or subtracts the second current to/from the first current signal.

Finally, the combined currents flow through the resistor $R_L$ to generate an output signal at the output node of the voltage to current converter 402. Accordingly, the voltage at the output node may consist of the sum or the difference of the input signal and the magnitude control signal (block 508).

Figure 6:
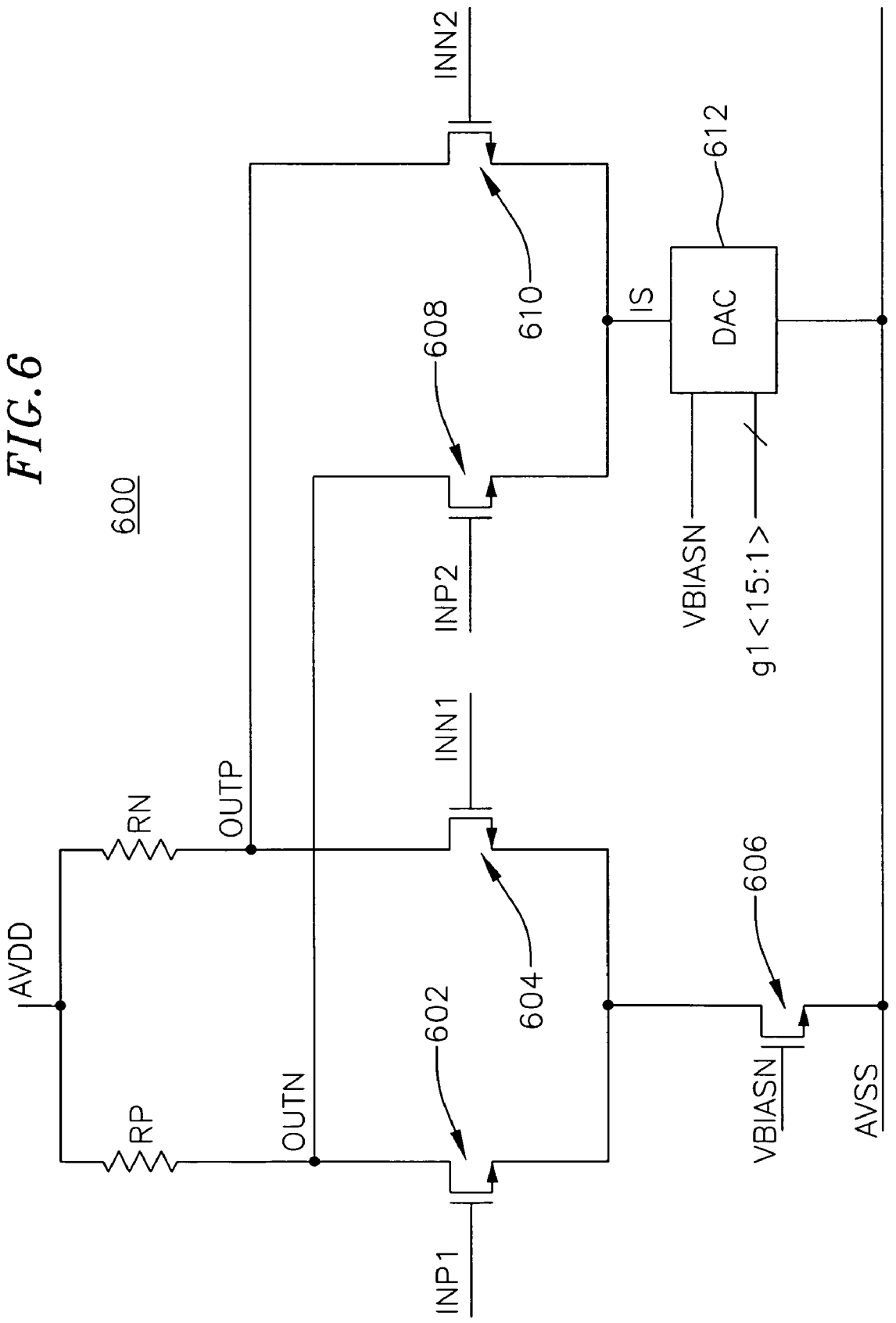
FIG. 6 is a simplified block diagram of one embodiment of a summer for a one tap decision feedback equalizer constructed in accordance with the invention.
Figure 7:
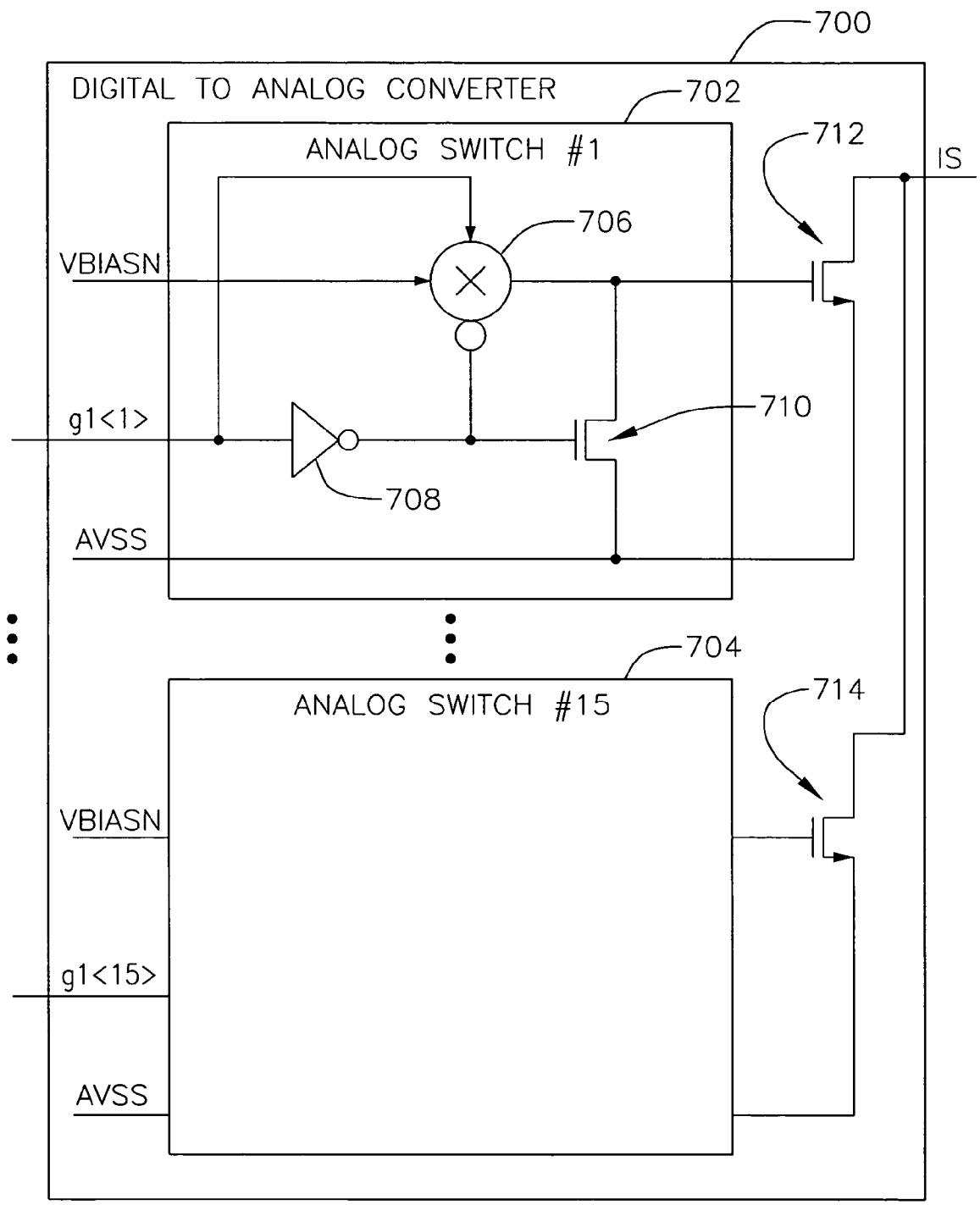
FIG. 7 is a simplified block diagram of one embodiment of a digital to analog converter constructed in accordance with the invention.

Referring now to FIGS. 6 and 7, one embodiment of a differential summer for a one tap decision feed back equalizer is described. The summer circuit 600 depicted in FIG. 6 provides a one step current mode summer with controllable equalization current selectable via a digital to analog converter 612. FIG. 7 describes an embodiment of a current mode digital to analog converter in more detail. The circuit 600 may be advantageous in high speed applications where, for example, it is important to minimize delay in the feedback path.

In FIG. 6, differential input signals INP1 and INN1 drive the inputs of a first differential transistor pair 602, 604. A transistor 606 provides a tail current for the first differential transistor pair. A bias signal VBIASN controls the magnitude of the tail current. The first differential transistor pair, in effect, converts the differential input voltage signal INP1, INN1 to a differential output current signal that flows through load resistors RP and RN.

A switch (e.g., differential transistor pair 608, 610) is coupled to the output nodes OUTN, OUTP of the differential transistor pair 602, 604. The differential transistor pair 608, 610 is controlled by differential input signals INP2, INN2. For a decision feedback equalizer application, the differential signal INP2, INN2 may be a differential binary signal output by the retimer (not shown).

Depending on the value of the binary signal, the differential transistor pair 608, 610 adds a current IS sunk by a programmable current source (in this example the digital to analog converter 612) to the output current for one of the nodes of the first differential transistor pair 602, 604. For example, when the signal INP2, INN2 has a relative value of +1, the differential transistor pair 608, 610 may add the current IS to the OUTN node. Alternatively, when the signal INP2, INN2 has a relative value of −1, the differential transistor pair 608, 610 may add the current IS to the OUTP node.

An input signal g1<15:1> for the digital to analog converter 612 controls the magnitude of the current IS. Thus, the digital to analog converter ("DAC") 612 may be used to provide incremental values of constant current according to the value of the input signal g1<15:1>. In the embodiment of FIG. 6, the magnitude of the current IS thereby depends on the value of the equalization coefficient for the decision feedback equalizer feedback path.

The resulting current flowing through the load resistors RP, RN will then equal the combination of the current from the first differential transistor pair 602, 604 and the second differential transistor pair 608, 610. This combined current, in turn, generates a differential voltage signal at the nodes OUTN, OUTP. Accordingly, the circuit 600 may be configured to add or subtract a voltage signal corresponding to the equalization coefficient to/from the input voltage signal INP1, INN1.

Typically, the second differential transistor pair 608, 610 is operated in saturation mode. In this mode, a relatively large differential signal INP2 and INN2 will operate the second differential transistor pair essentially as a switch in that the transistor pair 608 switches essentially all of the tail current IS to one of the output nodes OUTN, OUTP. Thus, essentially all of the current IS will be added to the output current flowing through one of the two load resistors RP, RN.

In this mode, the differential signal INP2, INN2 controlling the differential transistor pair 608, 610 needs to be large enough to cause the differential transistor pair 608, 610 to operate as a switch. Moreover, by making the differential signal INP2, INN2 sufficiently large, the output of the differential transistor pair 608, 610 may not be affected by relatively small variations in the amplitude of this signal.

In this mode of operation, the values selected for g1 and IS will essentially depend on the characteristics of the differential transistor pair 602, 604. In general, the differential transistor pair 602, 604 generates the output current $I_{OUT}$ by multiplying the input voltage $V_{IN}$ (INP1, INN1) by the transconductance ($g_m$) of the transistors 602, 604. This may be written as:

$$I_{OUT}=V_{IN}*g_m \quad \text{EQUATION 3}$$

The output voltage $V_{OUT}$ at nodes OUTN, OUTP may then be expressed as:

$$V_{OUT}=R[V_{IN}*g_m+IS] \quad \text{EQUATION 4}$$

where R is one of the load resistors RP, RN.

$V_{OUT}$ may then be rewritten as:

$$V_{OUT}=Rg_m[V_{IN} \pm IS/g_m] \quad \text{EQUATION 5}$$

By comparing Equation 2 with Equation 5, it can be readily observed that g1 is proportional to the ratio $IS/g_m$. Thus, by controlling the ratio of the current IS to the $g_m$ of the differential transistor pair 602,604, a desired equalization may be attained.

FIG. 7 is a simplified block diagram of one embodiment of a digital to analog converter 700. As this is but one example of a digital to analog converter it should be understood that other types of digital to analog converters may be used to implement the teachings herein.

The digital to analog converter 700 provides sixteen different levels of output current. In this embodiment the digital to analog converter 700 includes fifteen analog switches as represented in FIG. 7 by analog switch #1 702 to analog switch #15 704. For convenience the other switches and the internal details of switch 704 are not shown. Instead, ellipses are used to represent switches and other component that are not shown.

Each switch is controlled by one of the control signals g1<1> to g1<15>. In the embodiment of FIG. 6, the values of these control signals correspond to the desired equalization coefficient. Each control signal (e.g., signal g1<1>) controls a transfer gate (e.g., components 706 and 708) and a transistor (e.g., transistor 710).

The output of each switch thereby turns a corresponding output transistor (represented, in part, by transistors 712 and 714) off or biases it with input voltage VBIASN. The outputs of the transistors (e.g., 712 and 714) are combined to provide IS. Accordingly, the current IS varies in sixteen increments from zero (none of the output transistors 712, 714, etc. biased on) to a maximum current (all fifteen output transistors 712, 714, etc. biased on) according to the values of the fifteen coefficient signals g1<1>-g1<15>.

Figure 8:
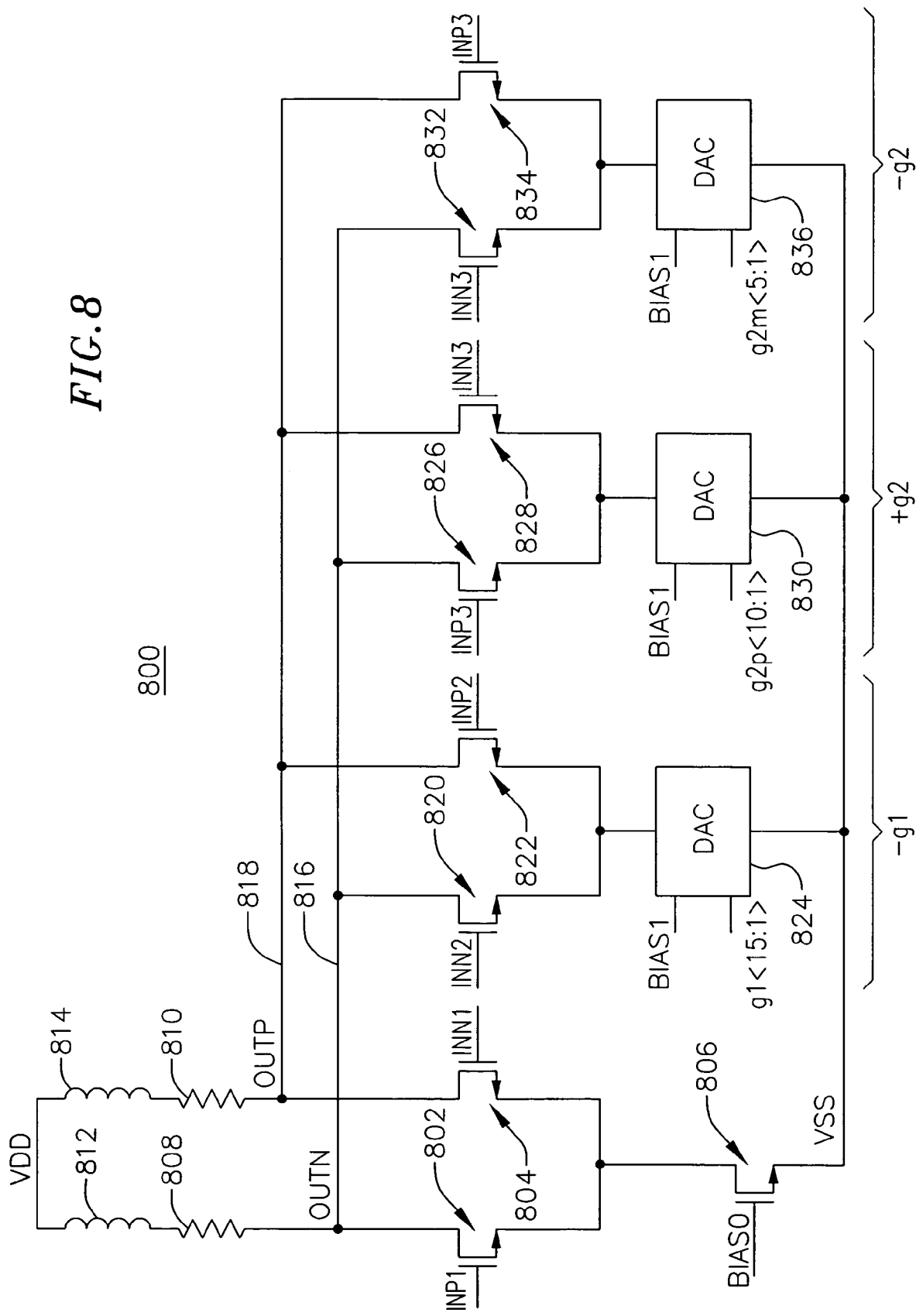
FIG. 8 is a simplified block diagram of one embodiment of a summer for a two tap decision feedback equalizer constructed in accordance with the invention.

FIG. 8 depicts one embodiment of a differential summer for a two-tap decision feedback equalizer. This embodiment includes a first and second differential transistor pair similar to those discussed above in conjunction with FIG. 6. A first differential transistor pair 802, 804 is driven by a differential input signal INP1, INN1 and provides output currents through load resistors 808 and 810. As a result, a differential output signal is generated at output nodes 816, 818. A current source transistor 806 provides a tail current for the differential transistor pair 802, 804 based on a bias voltage BIAS0. FIG. 8 also illustrates an embodiment where shunt peaking inductors 812, 814 may be used to improve the high speed performance of the summer 800.

A second differential transistor pair 820, 822 and an associated digital to analog converter 824 adds −g1 to the output signal. That is, the embodiment of FIG. 8 is configured so that the value of g1 is subtracted from the output signal. Hence, when INP2 is positive relative to INN2, current is added to the OUTP node. In the embodiment of FIG. 8, sixteen different values of −g1 may be added to the input signal by adding a current ranging from, for example, 0 mA to 4.8 mA.

The circuit 800 also includes a differential transistor pair 826, 828 and a differential transistor pair 832, 834 for adding or subtracting a second equalization coefficient g2 to/from the input signal, respectively. The differential transistor pair 826, 828 controls a current provided by a digital to analog converter 830 to add g2 to the input signal. In this embodiment, the inputs INP3 and INN3 of the differential transistor pair 826, 828 are provided by a second tap from the retimer (not shown). Here, eleven different values of +g2 may be added to the input signal by adding a current ranging from, for example, 0 mA to 2 mA.

The differential transistor pair 832, 834 controls a current provided by a digital to analog converter 836 to subtract g2 from the input signal. In this embodiment, the inputs INP3 and INN3 of the differential transistor pair 826, 828 are provided by a second tap from the retimer (not shown) but are reversed in polarity as compared to the differential transistor pair 826, 828. Here, six different values of −g2 may be added to the input signal by adding a current ranging from, for example, 0 mA to 1 mA.

Polarity, range, and resolution of −g1, +g2, and −g2 are selected according to the amount of equalization needed for the incoming data signal.

The embodiments of FIGS. 6 and 8 may provide several advantages over conventional decision feedback equalizer circuits. In a conventional decision feedback equalizer, for each additional tap (e.g., feedback path) a corresponding number of multiplications cells would be required in each feedback path. Thus, the embodiments of FIGS. 6 and 8 may provide significant power savings since multipliers are not used the feedback path. In addition, die area reduction may also be realized depending on resolution and range requirement of the equalization needed. Also, the circuit may enable faster data processing and more consistent data delays through the feedback path.

Figure 9:
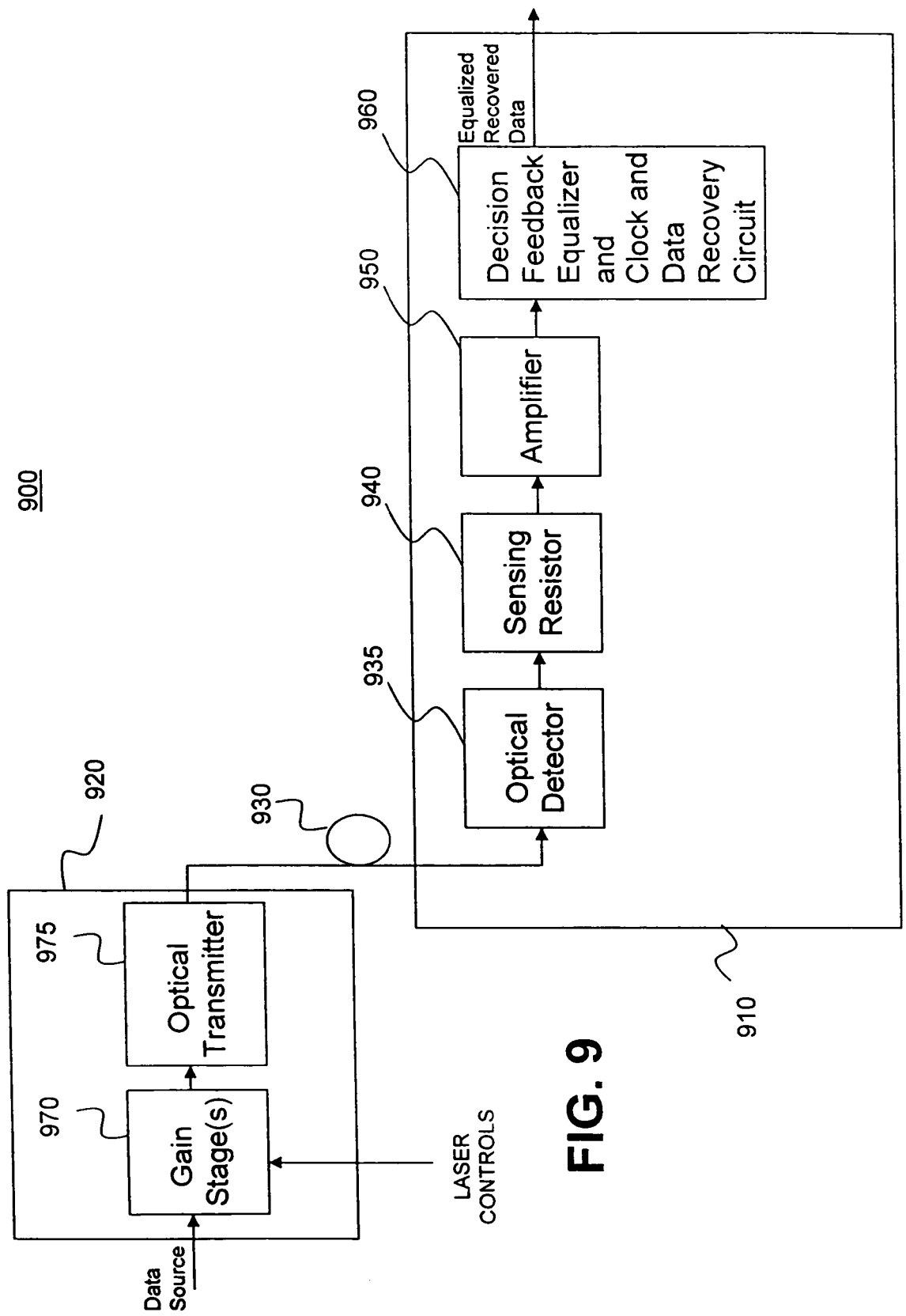
FIG. 9 is a simplified block diagram of one embodiment of an optical communications system constructed in accordance with the invention.

The summer circuit described herein may be integrated into any of a variety of applications. For example, referring to FIG. 9, the described exemplary summer circuit may be incorporated into a decision feedback equalizer in an optical receiver assembly 910 of an optical communication system 900. The optical system 900 includes an optical transmitter 920 and an optical fiber network 930 that carries the optical signal to the optical receiver assembly 910. Those skilled in the art will appreciate that the teachings of the invention are not limited to a single optical transmitter and receiver or to optical receivers. For example, practical optical communications systems may have one or more optical transmitters as well as one or more optical receivers.

The illustrated receive path includes an optical detector 935, sensing resistor 940, one or more amplifier(s) 950, and an integrated decision feedback equalizer and clock and data recovery circuit 960. The optical detector 935 may comprise a known prior art optical detector implementation. Such prior art detectors convert incoming optical signals into corresponding electrical output signals that may be electronically monitored.

A transmit path includes, by way of example, one or more gain stage(s) 970 coupled to an optical transmitter 975. The gain stage(s) 970 may have multiple stages, and may receive one or more control signals for controlling various different parameters of the output of the optical transmitter. In one embodiment an analog data source provides an analog data signal that modulates the output of the optical transmitter. In other embodiments, baseband digital modulation or frequency modulation may be used.

In this embodiment, the gain stage(s) 970 amplify the incoming data signal from the data source according to laser control signals. The amplified data signal, in turn, drives the optical transmitter 975.

The optical transmitter may, for example, be a light emitting diode or a surface emitting laser or an edge emitting laser that operate at high speeds such as 10 Gigabits per second ("Gbps") or higher. The optical transmitter 975 thereby generates an optical data signal that provided to a fiber optic cable 930.

The fiber optic cable 930 carries the optical data signal to the optical detector 935. In operation, when the transmit optical beam is incident on a light receiving surface area of the optical detector, electron-hole pairs are generated. A bias voltage applied across the optical detector 935 generates a flow of electric current having an intensity proportional to the intensity of the incident light. In one embodiment, this current flows through sensing resistor 940, and generates a voltage.

The sensed voltage is amplified by the one or more amplifier(s) 950 and the output of amplifier(s) 950 drives the integrated decision feedback equalizer and clock and data recovery circuit 960. The decision feedback equalizer may include, by way of example, a slicer that generates a binary signal that drives a clock and data recovery circuit. The clock and data recovery circuit generates an extracted clock signal from the binary signal that is then used to retime the equalized data as discussed above. One example of an integrated decision feedback equalizer and clock and data recovery circuit is described in U.S. patent application Ser. No. 10/823,252, filed Apr. 10, 2004, the disclosure of which is hereby incorporated by reference herein.

A receiver constructed according to the invention may support various data protocols and date rates. For example, in one embodiment the receiver is a multi-rate SONET/SDH/10GE/FEC receiver that may operate at very high speeds including, for example, 9.953, 10.3125, 10.664 or 10.709 Gbps. This receiver includes, in a single chip solution, an optical equalizer and CDR as discussed above, a linear amplifier, deserializer and other components.

In one embodiment the receiver chip is implemented using CMOS technology. However, the teachings herein are applicable to other types of processes including for example, GaAs, Bi-MOS, Bipolar, etc. Moreover, different types of transistors such as NFETS and PFETS may be used to implement circuits according to the teachings herein.

Different embodiments of the invention may include a variety of hardware and software processing components. In some embodiments of the invention, hardware components such as controllers, state machines and/or logic are used in a system constructed in accordance with the invention. In some embodiment of the invention, code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards.

The signals discussed herein may take several forms. For example, in some embodiments a signal may be an electrical signal transmitted over a wire while other signals may consist of light pulses transmitted over an optical fiber. A signal may comprise more than one signal. For example, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

In summary, the invention described herein generally relates to an improved and simplified equalizer circuit. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A decision feedback equalizer comprising:
a summer configured to either add or subtract at least one equalization coefficient signal to or from an input signal according to at least one control signal, wherein the summer comprises:
a first differential transistor pair configured to receive the input signal,
a second differential transistor pair for each equalization coefficient signal and configured to determine if the summer either adds or subtracts based upon the at least one control signal, and
a digital to analog converter for each equalization coefficient signal, wherein each digital to analog converter is coupled with a respective second differential transistor pair and configured to, based upon the digital to analog converter's respective equalization coefficient signal, control a current of the respective second differential transistor pair, and is not configured to control a current of the first differential transistor pair;

a slicer configured to convert the summed signal to a binary signal; and a retimer configured to sample the binary signal according to a clock signal, wherein the retimer generates the at least one control signal.

2. The decision feedback equalizer of claim 1 wherein each control signal controls whether an equalization coefficient signal is added to or subtracted from the input signal.

3. The decision feedback equalizer of claim 1 wherein each control signal is a binary signal.

4. The decision feedback equalizer of claim 1 wherein the summer comprises a current summer.

5. The decision feedback equalizer of claim 4 wherein the current summer combines a first current signal in accordance with the input signal and at least one second current signal in accordance with the at least one equalization coefficient signal.

6. The decision feedback equalizer of claim 5 comprising a digital to analog converter configured to provide the at least one second current signal in accordance with the at least one coefficient signal.

7. The decision feedback equalizer of claim 6 comprising a differential transistor pair configured to provide the at least one second current signal.

8. The decision feedback equalizer of claim 1 wherein the summer comprises:
a first differential transistor pair;
at least one switch; and
at least one programmable current source.

9. The circuit of claim 8 wherein the at least one switch comprises at least one second differential transistor pair.

10. The decision feedback equalizer of claim 1 wherein each of the second differential transistor pairs controls a current sunk by the at least one digital to analog converter.

11. The decision feedback equalizer of claim 10 wherein the at least one digital to analog converter sinks current in accordance with at least one equalization coefficient.

12. The decision feedback equalizer of claim 10 wherein the at least one digital to analog converter sinks current in accordance with the product of an equalization coefficient and a transconductance associated with the first differential transistor pair.

13. The decision feedback equalizer of claim 1 wherein the at least one digital to analog converter comprises:

a plurality of analog switches; and
a plurality of output transistors.

14. The decision feedback equalizer of claim 13 wherein the plurality of analog switches are associated with at least one equalization coefficient.

15. A method of equalizing an input signal comprising:
selectively adding or subtracting at least one equalization coefficient signal to or from an input signal according to at least one control signal, wherein selectively adding or subtracting comprises employing:
a first differential transistor pair configured to receive the input signal;
at least one digital switch for each equalization coefficient signal to select between either addition or subtraction is to be performed; and
at least one programmable current source, for each equalization coefficient signal, to convert the respective equalization coefficient signal to a current to be added or subtracted, based upon the respective digital switch to a current of the first differential transistor pair;
converting the summed signal to a binary signal; and
sampling the binary signal according to a clock signal to generate the at least one control signal.

16. The method of claim 15 wherein each control signal controls whether an equalization coefficient signal is added to or subtracted from the input signal.

17. The method of claim 15 wherein each control signal is a binary signal.

18. The method of claim 15 comprising combining a first current signal in accordance with the input signal and at least one second current signal in accordance with the at least one equalization coefficient signal.

19. The method of claim 18 comprising wherein the at least one second current signal is provided by at least one digital to analog converter.

20. The method of claim 19 wherein the at least one digital to analog converter sinks current in accordance with the at least one equalization coefficient signal.

21. The method of claim 15 comprising providing each at least one second current signal in accordance with the product of an equalization coefficient and a transconductance associated with a first differential transistor pair.

* * * * *